US006775609B2

(12) United States Patent
Ozeki et al.

(10) Patent No.: US 6,775,609 B2
(45) Date of Patent: Aug. 10, 2004

(54) ELECTRONIC CONTROL UNIT FOR VEHICLE HAVING OPERATION MONITORING FUNCTION AND FAIL-SAFE FUNCTION

(75) Inventors: Yoshifumi Ozeki, Anjo (JP); Yoshiharu Takeuchi, Kariya (JP); Yasuhiro Tanaka, Nisshin (JP); Takahiro Joko, Toyota (JP)

(73) Assignee: Denso Corporation, Kariya (JP)

(*) Notice: Subject to any disclaimer, the term of this patent is extended or adjusted under 35 U.S.C. 154(b) by 58 days.

(21) Appl. No.: 10/242,697

(22) Filed: Sep. 13, 2002

(65) Prior Publication Data

US 2003/0060964 A1 Mar. 27, 2003

(30) Foreign Application Priority Data

Sep. 27, 2001 (JP) ....................................... 2001-295627
Nov. 30, 2001 (JP) ....................................... 2001-366974
Jan. 30, 2002 (JP) ....................................... 2002-021060

(51) Int. Cl.[7] .......................... F02D 35/00; G06F 19/00
(52) U.S. Cl. ........................ 701/114; 701/115; 123/396
(58) Field of Search ................................ 701/114, 115, 701/102; 123/396, 399, 361; 73/117.3

(56) References Cited

U.S. PATENT DOCUMENTS

| | | | | | |
|---|---|---|---|---|---|
| 4,887,215 | A | * | 12/1989 | Kumagai et al. | 701/102 |
| 5,880,568 | A | * | 3/1999 | Bederna et al. | 701/29 |
| 6,330,668 | B1 | * | 12/2001 | Curiger et al. | 713/1 |
| 6,341,239 | B1 | * | 1/2002 | Hayashi et al. | 700/79 |
| 2003/0083802 | A1 | * | 5/2003 | Miyano | 701/114 |

* cited by examiner

*Primary Examiner*—Hieu T. Vo
(74) *Attorney, Agent, or Firm*—Nixon & Vanderhye P.C.

(57) ABSTRACT

An engine ECU comprises a control CPU for executing engine control and a watchdog circuit for monitoring the CPU. The watchdog circuit stores, whenever a reset signal is outputted to the CPU, a reset information indicating a fault record. The CPU executes, after it is once reset and re-started, the predetermined fail-safe process based on the reset information stored. When a monitor CPU connected to the control CPU for making communication is used as the watchdog circuit, fault detection times X and Y are specified to satisfy the relationship of $X \geqq Y$, when the communication fault detection time is defined as X and the watchdog pulse fault detection time as Y.

22 Claims, 15 Drawing Sheets

ELECTRONIC CONTROL UNIT FOR VEHICLE HAVING OPERATION MONITORING FUNCTION AND FAIL-SAFE FUNCTION

CROSS REFERENCE TO RELATED APPLICATION

This application is based on and incorporates herein by reference Japanese Patent Applications No. 2001-295627, 2001-366974 and 2002-21060 filed on Sep. 27, 2001, Nov. 30, 2001 and Jan. 30, 2002, respectively.

FIELD OF THE INVENTION

The present invention relates an electronic control unit (ECU) for vehicle and particularly to a process to be executed when a fault occurs in a CPU of the ECU.

BACKGROUND OF THE INVENTION

In recent years, with development in function and capacity of memories (ROM and RAM), it can be thought to realize engine control (injection and ignition control) and throttle control, which have been performed with a couple of CPUs in the prior art, with only one CPU for reduction in cost of engine ECU. In the engine ECU formed of only one CPU, a fault in the CPU can be detected with a watchdog (WD) circuit like the prior art. However, when the defective condition of a CPU is recovered to the normal condition, it is impossible to determine what kind of fault has occurred in the past. There arises a disadvantage that a fail-safe process, which shall be executed is no longer executed. Namely, after a fault is generated once in the CPU, the possibility of re-generation of similar fault is considerably high. Therefore, it is desirable to continue the fail-safe process after the CPU is re-started.

In the other engine ECU, two CPUs are provided as a main-CPU and a sub-CPU. The former operates to execute injection control and ignition control, while the latter operates to execute electronic throttle control. A WD circuit is provided to monitor operations of the main-CPU. This circuit receives as an input a watchdog pulse (WD pulse) and resets the main-CPU when the periodicity of the WD pulse is disrupted.

Moreover, the main-CPU also monitors operations of the sub-CPU (namely, throttle control condition). The main-CPU receives as an input the WD pulse outputted from the sub-CPU and also resets the sub-CPU when the periodicity of the WD pulse is disrupted. When the sub-CPU is reset, the main-CPU executes the predetermined fail-safe process.

In short, the main-CPU is reset by the WD circuit and the sub-CPU is reset by the main-CPU. Moreover, when the WD circuit resets the main-CPU, the main-CPU subsequently resets the sub-CPU. However, the main-CPU normally recovers after it is reset by the WD circuit, the normal control is executed without relation to reset (namely, generation of a fault) in the past. Therefore, when it is requested to continue the predetermined fail-safe process even after recovery from the reset, there arises a disadvantage that the fail-safe process to be executed is not executed.

When it is assumed that a control CPU is operated uncontrollably in the electronic control unit including two CPUs for control and monitor, there arises a problem that a communication fault and an output fault of the WD pulse are simultaneously generated in the main-CPU and these fault information pieces cannot be stored and held. More practically, if a communication fault is detected in advance, the control CPU is reset in this time point by the monitor CPU and output fault of WD pulse cannot be stored. Accordingly, in some cases, if the CPU is operated uncontrollably, such condition may be recognized only as a communication fault.

SUMMARY OF THE INVENTION

It is therefore an object of the present invention to execute a fail-safe process after a fault occurs in a CPU and to appropriately identify the content of fault.

According to the first aspect of the present invention, a CPU executes engine control, electronic throttle control and a predetermined fail-safe process. A monitor circuit receives, from the CPU, as an input a watchdog (WD) pulse in the predetermined period and outputs a reset signal to the CPU when the periodicity is disrupted. When the reset signal is outputted from the monitor circuit, the CPU is reset and reset information which indicates a record of the reset signal is then stored in a storage. After the CPU is reset, the CPU is re-started after the predetermined period has passed. When the CPU is re-started, it executes the predetermined fail-safe process based on the reset information stored in the storage.

According to the second aspect of the present invention, there are provided a main-CPU, a sub-CPU and a monitor circuit for monitoring operations of the main-CPU which are mutually connected for the purpose of communication. The monitor circuit receives as an input, from the main-CPU, a watchdog (WD) pulse which is generated in the predetermined period. The sub-CPU monitors the WD pulse which is outputted to the monitor circuit from the main-CPU. If the periodicity thereof is disrupted, a reset record of the main-CPU is stored in the memory at least until the reset signal is outputted from the monitor circuit.

Owing to this structure, it can surely be determined in the sub-CPU that the main-CPU is reset, namely a fault is generated in the main-CPU. Moreover, in this structure, when the main-CPU is reset, the sub-CPU is also subsequently reset. However, since the sub-CPU stores a reset record simultaneously with or preceding the reset of the main-CPU from the monitor circuit, a reset record can surely be stored and held. Otherwise, the reset signal which is outputted to the main-CPU from the monitor circuit can be monitored. A reset record may be stored in the memory when this reset signal is outputted.

According to a third aspect of the present invention, a monitor CPU monitors communication with a control CPU and stores a fault condition, if a fault occurs in the communication. The monitor CPU also resets the control CPU. Moreover, the monitor CPU also monitors a watchdog (WD) pulse outputted from the control CPU and detects a fault from the periodicity thereof and stores the situation when a fault occurs in the WD pulse. In this case, when a fault detection time for the communication condition is defined as X and a fault detection time for the WD pulse as Y, the fault detection times X and Y are specified to satisfy the relationship of X is equal to or larger than Y.

According to the above structure, if the control CPU generates a fault (uncontrolled operating condition) and both communication and output of WD pulse stop, occurrence of a fault in the WD pulse is previously generated when a fault detection time Y has passed and it is then stored. Thereafter, when a fault detection time X has passed, occurrence of a fault in the communication is detected and it is then stored to reset the control CPU. Namely, a WD pulse fault and a communication fault are surely stored respectively and content of fault can be correctly identified.

When the CPU is operated uncontrollably, it is desirable that a WD pulse fault be more quickly detected with priority than a communication fault. The control CPU may be reset without any condition when a communication fault is detected but a reset output is restricted as required. Therefore, for example, if the control CPU is operated uncontrollably and both communication and WD pulse output are stopped, a reset output when a communication fault is detected is restricted and thereby a WD pulse fault and a communication fault are surely stored.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENTS (First Embodiment)

Figure 1:
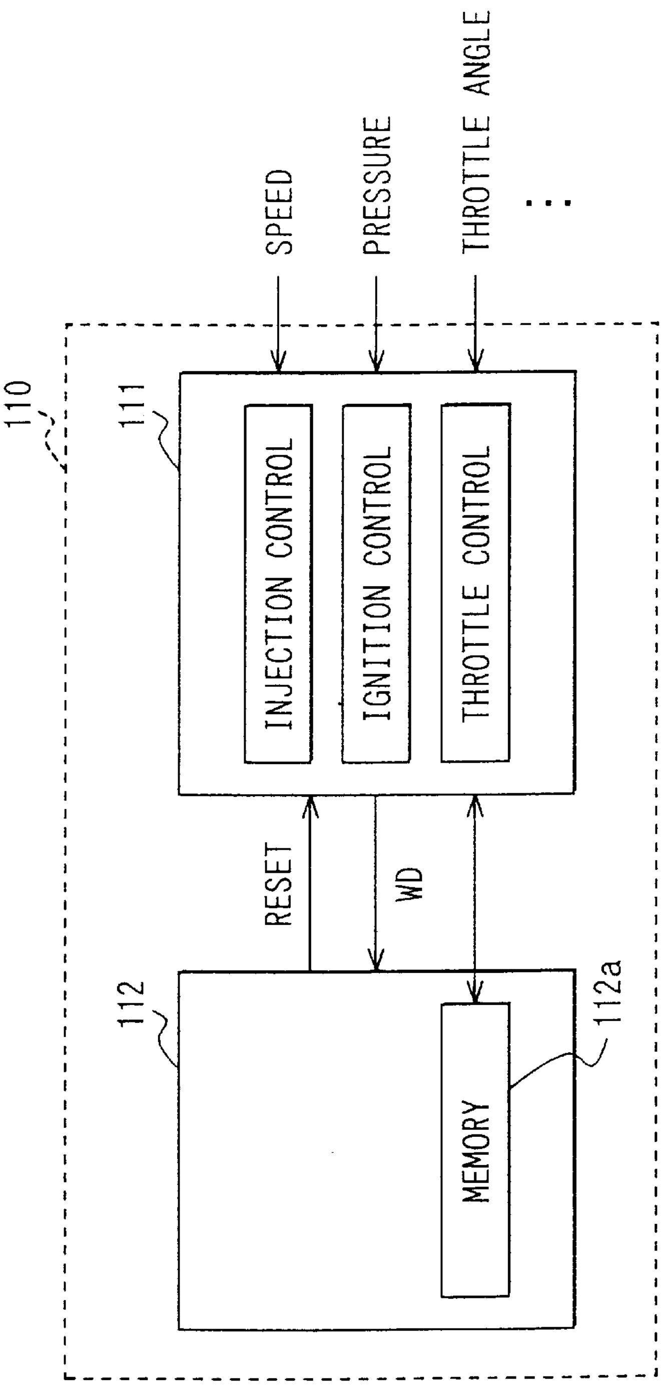
FIG. 1 is a block diagram of an engine ECU according to the first embodiment of the present invention.

Referring to FIG. 1, an engine ECU 110 is provided with a CPU 111 for injection control and ignition control of an engine and throttle control, and a watchdog (WD) circuit 112 for monitoring operations of the CPU 111. The CPU 111 receives, as inputs, from time to time engine operation information such as an engine speed, an intake manifold pressure and a throttle angle in order to control a fuel injection valve, igniter and throttle actuator (not illustrated) on the basis of the relevant operation information. Moreover, the CPU 111 outputs a WD pulse which is inverted in the predetermined cycle to the WD circuit 112.

The WD circuit 112 as a monitor circuit outputs a reset signal to the CPU 111 when the WD pulse from the CPU 111 is not inverted for the predetermined time or longer. Moreover, the WD circuit 112 is provided with a memory 112*a*, for example consisting of a flip-flop and a counter or the like, in order to store reset information indicating a record of each reset signal output to the CPU 111. In this embodiment, when a reset signal is outputted, a reset counter is incremented one by one to count up the number of times of resetting operation as the reset information. In this embodiment, the WD circuit 112 and memory 112*a* are integrated in the same circuit to simplify the structure.

The CPU 111 executes the predetermined fail-safe process as required for the throttle control based on the reset information stored in the WD circuit 112. More practically, as the fail-safe process, the cylinder reduction control for stopping fuel injection of a part of cylinders and retard angle control of ignition time point are executed in order to realize a limp-home running of the vehicle.

Next, the process executed when a CPU is started with the CPU 111 and an ignition switch (IG switch) is OFF will be explained with reference to FIG. 2 and FIG. 3.

Figure 2:
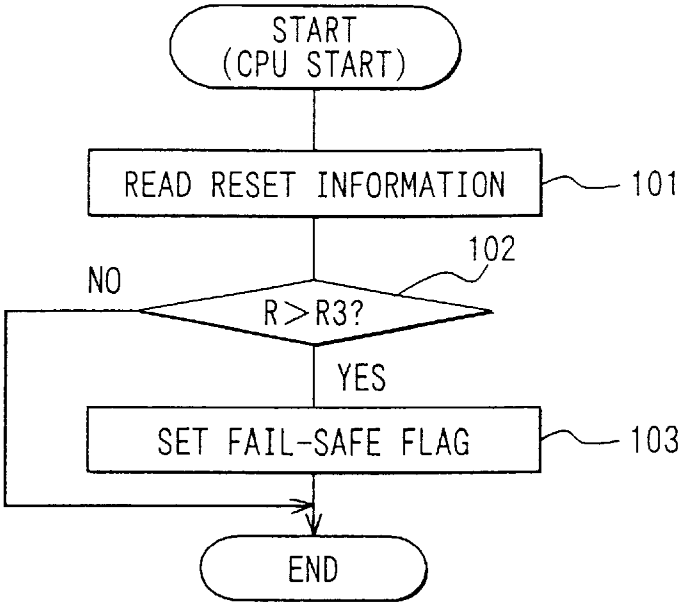
FIG. 2 is a flowchart of a process executed in the first embodiment when a CPU is started.

FIG. 2 is a flowchart of processes when the CPU 111 is started. At time point that the CPU 111 is started, a reset information (number of times of reset) stored in the memory 112*a* of the WD circuit 112 is read first at step 101. Subsequently, at step 102, it is determined whether the number of times of reset R is the predetermined value (for three times) or larger. When the number of times of reset R is equal to the predetermined value R3 or larger, the process proceeds to step 103 to set a fail-safe flag in order to execute the fail-safe process of throttle control. When the number of times of reset R is less than the predetermined value R3, an ordinary control is executed without execution of the fail-safe process.

Figure 3:
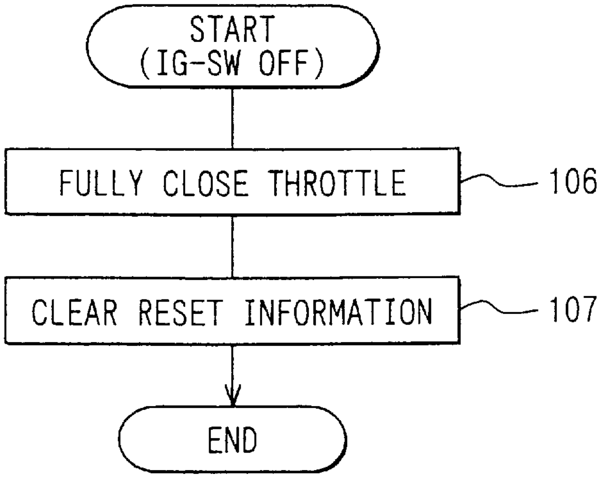
FIG. 3 is a flowchart of a process executed in the first embodiment when an IG switch is OFF.

FIG. 3 is a flowchart of processes when the ignition switch is OFF (turned off from ON). When the IG switch is OFF, the control for fully closing the throttle valve is executed at step 106. In the subsequent step 107, the reset information stored in the memory 112*a* of the WD circuit 112 is cleared. Namely, the reset counter is cleared to 0.

Figure 4:
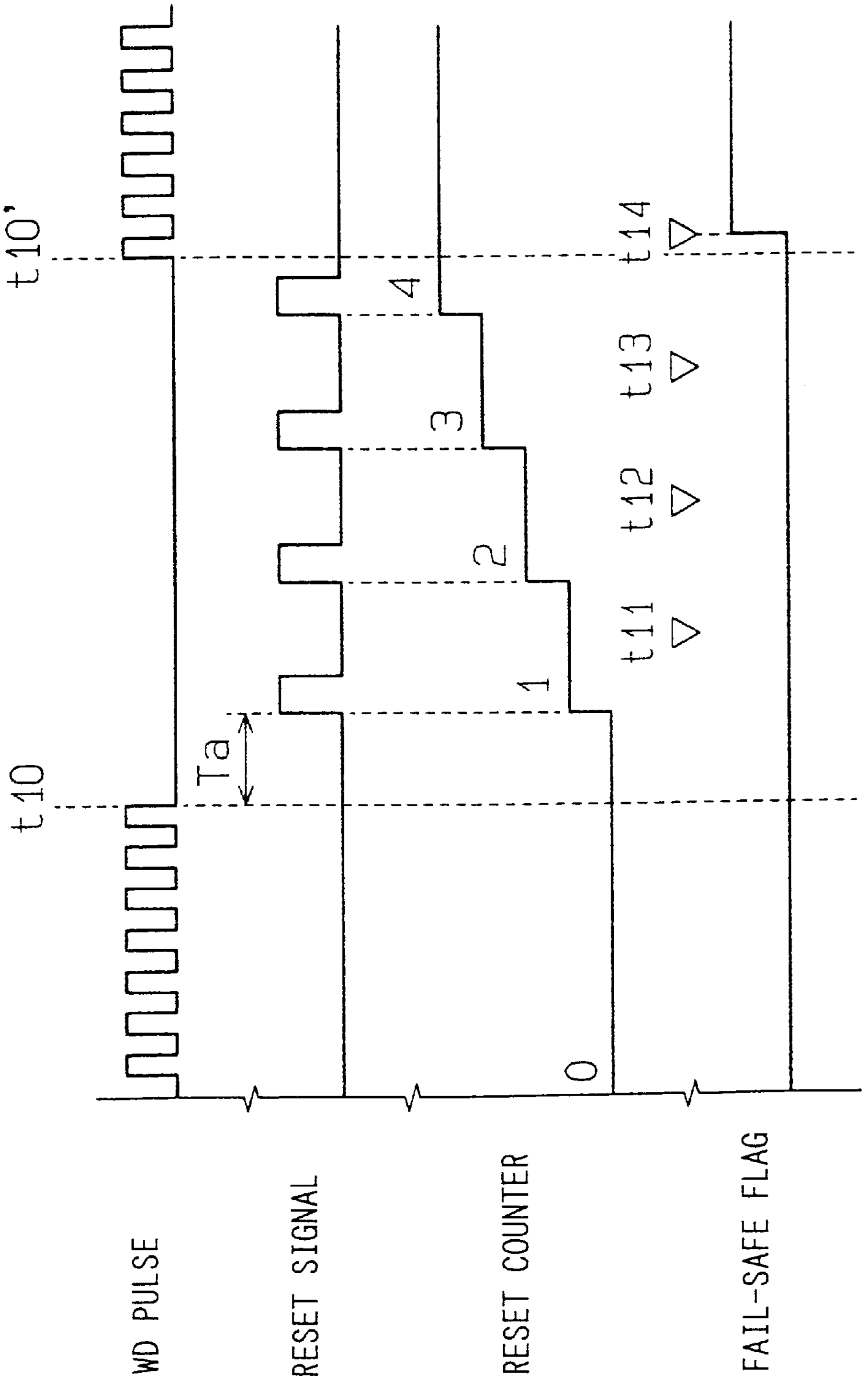
FIG. 4 is a time chart showing practical operations of the CPU in the first embodiment.

FIG. 4 is a time chart illustrating practical operations of the CPU 111. Before the time point t10, the CPU 111 operates normally and the WD pulse is normally outputted while keeping the predetermined periodicity. When a fault of CPU 111 arises at time point t10 and thereby the WD pulse is not longer outputted, a reset signal is outputted to the CPU 111 from the WD circuit 112 after the time Ta has passed. Thereby, the CPU 111 is reset.

Moreover, in this time point, the reset counter of the memory 112*a* is incremented by one in the WD circuit 112.

Thereafter, if the WD pulse is no longer outputted, the reset signal is outputted for every constant time (Ta) and the reset counter is simultaneously incremented one by one.

In the figure, the mark (triangle) indicates the re-start time point of the CPU 111 after it is reset. However, in the re-start time points of t11, t12, t13, the CPU 111 is actually not re-started because the CPU 111 does not recover its normal condition from the fault condition (the WD pulse is not outputted).

At time point t10', the CPU 111 recovers to the normal operation and the WD pulse is inverted again. Therefore, when the CPU is re-started at time point t14, a fail-safe flag is set based on a value of the reset counter in this time point. Thereby, the predetermined fail-safe process is executed. Thereafter, a value (reset information) of the reset counter is held and the predetermined fail-safe process is continued until the IG switch is turned off.

In this first embodiment, the fail-safe process can be executed as required when the CPU 111 recovers to the normal condition after a fault occurs in the CPU. As a result, in the engine ECU of the single CPU structure in which engine control and electronic throttle control are executed by only one CPU 111, the fail-safe process after a fault is generated in the CPU 111 can be executed appropriately.

Since the number of times of reset as the reset information is counted with the reset counter, the situation for starting the fail-safe process when the CPU 111 is re-started can be changed easily by changing a threshold value of the reset counter. Moreover, since the fail-safe process is executed only when the number of times of reset reaches the predetermined value (for example, three times), the fail-safe process is not executed erroneously due to a noise or the like.

Moreover, since the reset information (value of reset counter) is cleared by the CPU 111, execution of the fail-safe process can be appropriately controlled. For example, the control that the fail-safe process is continued until the IG switch is turned off can surely be realized.

In this embodiment, it is also possible to store a flag information or the like to the memory in place of the number of times of reset as the reset information (record of the reset signal output). Moreover, the memory 112*a* can also be provided separately from the WD circuit 12.

(Second Embodiment)

Figure 5:
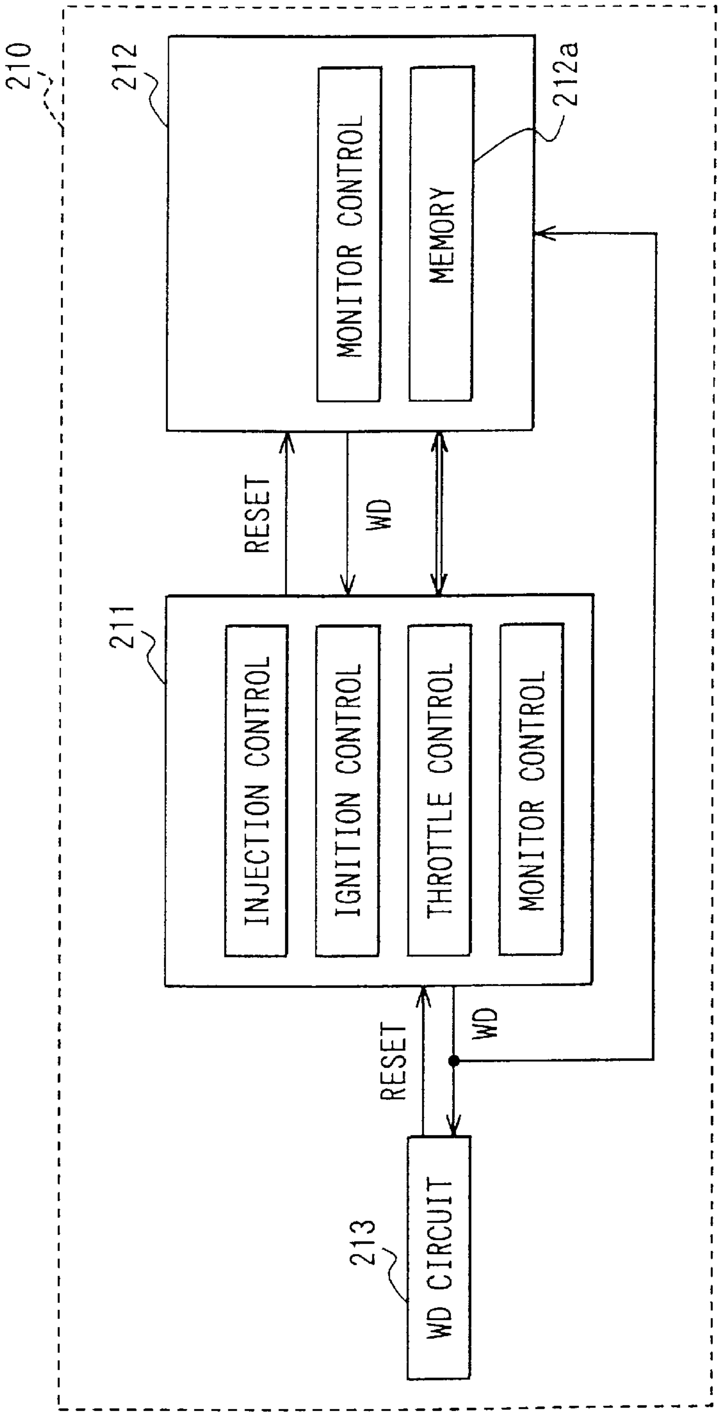
FIG. 5 is a block diagram of an engine ECU according to the second embodiment of the present invention.

In FIG. 5, an engine ECU 210 is provided with a control CPU (main-CPU) 211 for performing injection control and ignition control of engine and electronic throttle control, a monitor CPU (sub-CPU) 212 for executing monitor control for the electronic throttle control and a WD circuit 213 for monitoring operations of the control CPU. The control CPU 211 receives, as required, as an input engine operation information such as an engine speed, an intake manifold pressure and an throttle angle or the like from various sensors and controls, based on the relevant operation information, fuel injectors, igniter, throttle actuator or the like not illustrated.

Moreover, the control CPU 211 performs monitor control for monitoring operations of the monitor CPU 212. Namely, the monitor CPU 212 outputs a WD pulse which is inverted in the predetermined time to the control CPU 211 and also outputs a reset signal to the monitor CPU 212 when the WD pulse from the monitor CPU is not inverted for the predetermined time or longer.

The control CPU 211 and the monitor CPU 212 are connected for making communications with each other, and the control CPU 211 transmits, to the monitor CPU 212, the data for throttle control such as throttle angle, accelerator position and fail-safe execution flag or the like. In this time point, the monitor CPU 212 compares, as the monitor process of throttle control, the data of throttle angle and accelerator position inputted, for example, through an A/D converter (not illustrated) with the data of throttle angle and accelerator position received from the control CPU 211. The monitor CPU 212 also detects a fault in the throttle control condition depending on whether these data are matched or not. The result of this monitor operation is returned to the control CPU 211.

The control CPU 211 implements the predetermined fail-safe process when a fault occurs in the electronic throttle control depending on the result of monitor by the monitor CPU 212. More practically, as the fail-safe process, the cylinder reduction control for stopping fuel injection of a part of cylinders and retard angle control of ignition time point are executed in order to realize a limp-home running of the vehicle.

Moreover, the control CPU 211 outputs the WD pulse which is inverted in the predetermined cycle to the WD circuit 213. The WD circuit 213 forms a monitor circuit. This WD circuit 213 outputs a reset signal to the control CPU 211 when the WD pulse from the control CPU 211 is not inverted for the predetermined time or longer.

Here, the WD pulse outputted to the WD circuit 213 from the control CPU 211 is also inputted to the monitor CPU 212. The monitor CPU 212 determines existence of the predetermined edge (for example, falling edge) of the WD pulse. When the predetermined edge is not detected for the predetermined period or longer, namely when the WD pulse is not inverted for the predetermined or longer, a reset record of the control CPU 211 is stored in the memory 212*a*. The memory 212*a* is an EEPROM or a standby RAM or the like which is capable of storing and holding such reset record even if power failure occurs. Moreover, this memory also stores the values of the various counters in addition to the reset record.

Figure 6:
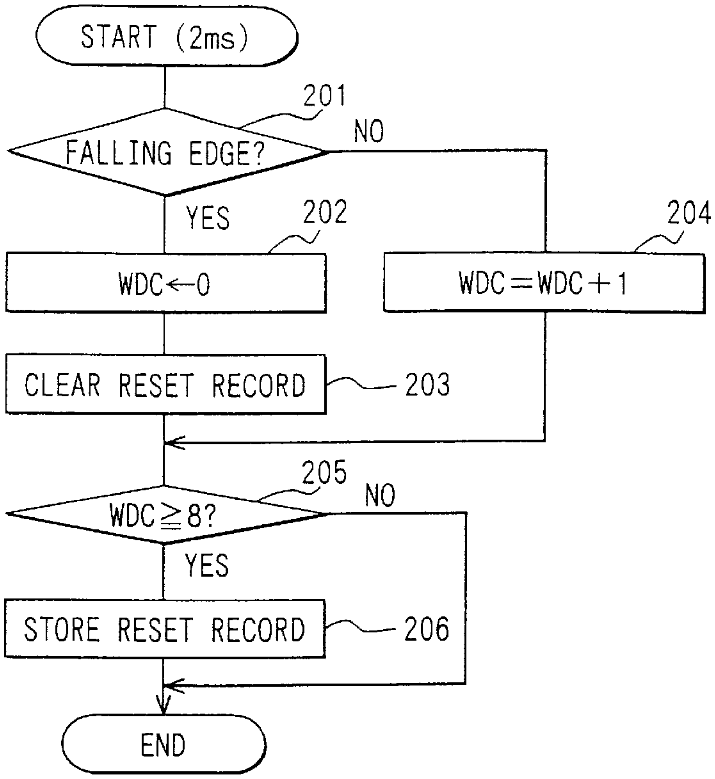
FIG. 6 is a flowchart of a 2 msec process executed by a monitor CPU in the second embodiment.

Next, procedures for monitoring the control CPU 211 by the WD pulse will be explained in detail. FIG. 6 is a flowchart of the processes to be executed in every 2 msec by the monitor CPU 212.

In FIG. 6, first, at step 201, a falling edge of the WD pulse is detected. More practically, it is determined whether the signal level of the present WD pulse is low or not and the preceding signal level is high or not. When the result is YES, it is determined that the falling edge of the present WD pulse is detected. In the case of YES, the WD monitor counter (WDC) is cleared to 0 at step 202 and a reset record is cleared at step 203. Moreover, when the result is NO, the WD monitor counter WDC is incremented by one at step 204.

Thereafter, it is determined whether a value of the WD monitor counter WDC is equal to the predetermined value or larger at step 205. Here, the time corresponding to the predetermined value is shorter than the time where output stop of the WD pulse is determined by the WD circuit 213. When a fault determination time by the WD circuit 213 is for example 24 msec, a fault determination time by the monitor CPU 212 is set to 16 msec and the predetermined value is set to 8. When the result of determination is YES at step 205, the process proceeds to step 206. The reset record indicating that the control CPU 211 is reset is stored in the memory 212*a*.

Figure 7:
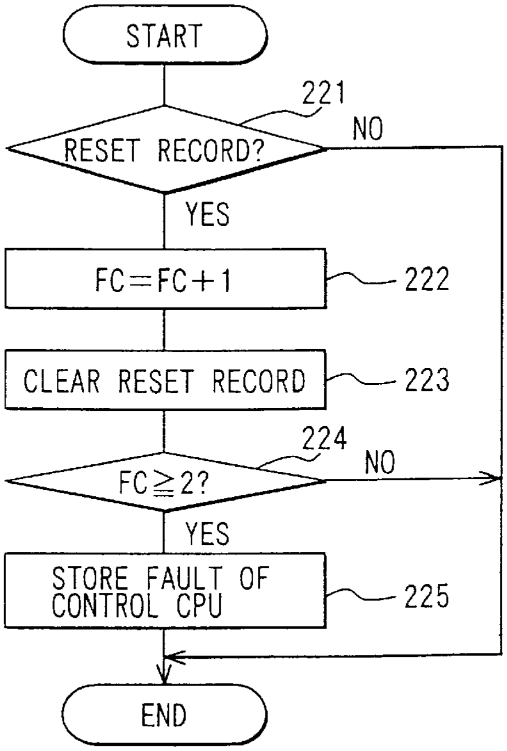
FIG. 7 is a flowchart of an initial process executed by the monitor CPU in the second embodiment.

Moreover, FIG. 7 is a flowchart of the initial process to be executed at the time of initialization (starting) of the monitor CPU 212.

In FIG. 7, first, at step 221, it is determined whether the reset record of the memory 212*a* exists or not. When the reset record exists, the process proceeds to step 222 to increment a fault counter FC by one. Moreover, at step 223, the reset record of the memory 212*a* is cleared.

Thereafter, whether the fault counter FC has the predetermined value (2 in this embodiment) or larger is determined at step 224. When the result is YES, the process proceeds to the step 225 to store the content that a fault is generated in the control CPU 211 to the memory 212*a*. In this case, fault information is notified of the control CPU 211 to execute the predetermined fail-safe process.

Although a process flow is not illustrated, when the ignition switch is set to OFF because the engine operation stops, a fault counter FC is cleared. Therefore, when the reset is generated twice during single trip of the running vehicle, a fault of CPU is determined.

Figure 8:
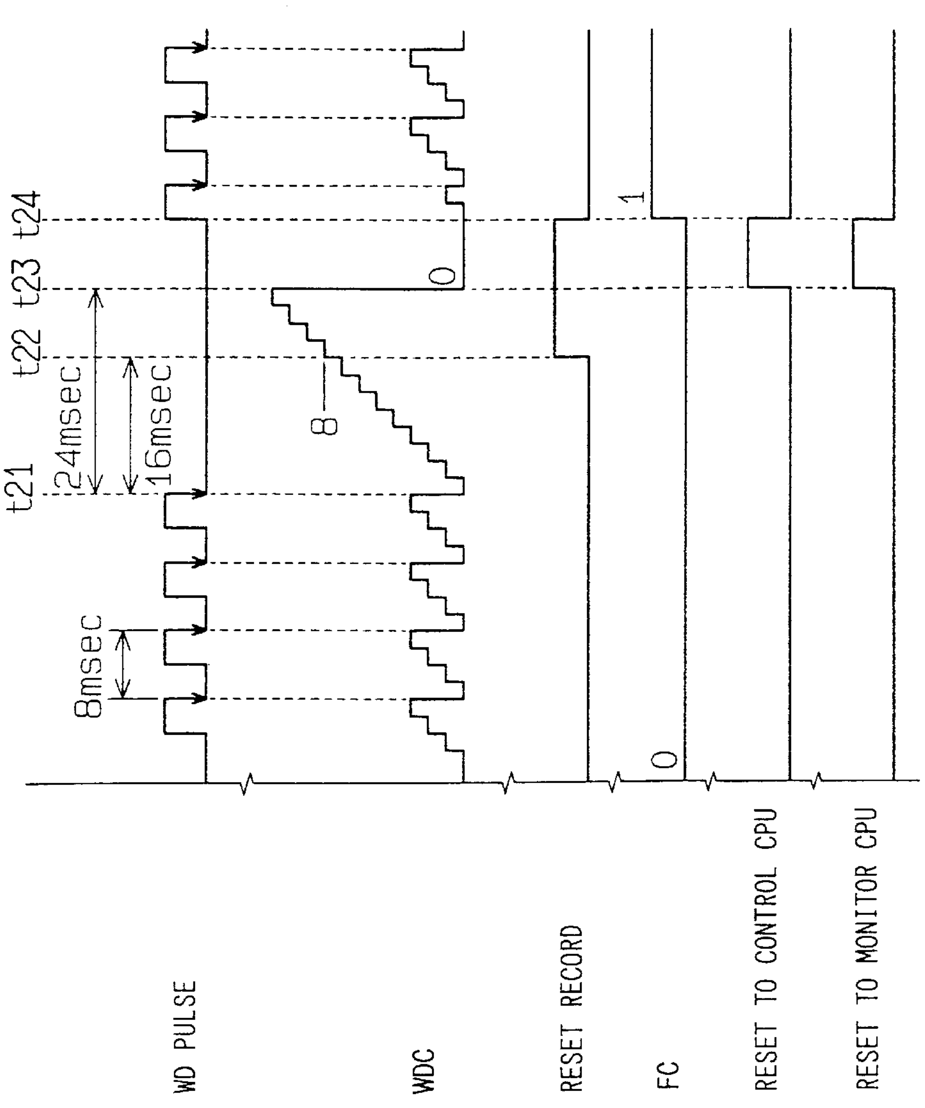
FIG. 8 is a time chart illustrating a fault detection operation in the second embodiment.

FIG. 8 is a time chart for explaining the processes of FIG. 6 and FIG. 7. In FIG. 8, it is assumed that the control CPU 211 is in the normally operating condition before the time point t21 and a fault is generated in the control CPU 211 after the time point t21.

Before the time point t21, the WD pulse is outputted in the predetermined constant period (8 m sec period). In this case, the WD monitor counter is incremented in every 2 msec and it is cleared to 0 whenever the falling edge of the WD pulse is detected.

When the output of WD pulse is stopped after the time point t21, the WD monitor counter is not cleared to 0. Therefore, the same counter reaches the predetermined value (=8) at time point t22. In this case, a reset record is stored in the memory 212*a* of the monitor CPU 212. Thereafter, the WD circuit 213 outputs the reset signal to the control CPU 211 at time point t23 after 24 msec from the stop of output of the WD pulse. Moreover, in this case, the control CPU 211 outputs the reset signal to the monitor CPU 212.

Thereafter, the control CPU 211 and monitor CPU 212 are re-started at time point t24 and a fault counter is incremented by one with the reset record stored in the memory 212*a* in the initial process of the monitor CPU 212. In this time point, when the fault counter has a value of 2 or larger, the control CPU 212 is determined to generate a fault and the predetermined fail-safe process is executed.

For instance, when output of the WD pulse is re-started during the time points from t22 to t23, namely, when output of the WD pulse is recovered to normal condition before output of reset signal by the WD circuit 213 after output of the WD pulse is temporarily stopped, the reset record in the memory 212*a* is cleared when the falling edge of the WD pulse appears. Therefore, a disadvantage that only the reset record is actually left even when the reset by the WD circuit 213 is not executed can be eliminated.

In this second embodiment, since the WD pulse outputted to the WD circuit 213 from the control CPU 211 is monitored with the monitor CPU 212 and a reset record is stored depending on the result of monitor, reset of the control CPU 211 can surely be determined. Therefore, the fail-safe process can be implemented appropriately after a fault is detected in the CPU.

Moreover, since the monitor CPU 212 stores the reset record more quickly than reset output by the WD circuit 213, the reset record can surely be stored. As a result, past fault information of CPU can be appropriately stored and held. When output of the WD pulse is recovered to the normal condition after the monitor CPU 212 stores the reset record, the reset record is deleted. Thereby, a disadvantage that the reset record is erroneously stored can be eliminated.

The second embodiment explained above may be modified as illustrated in FIG. 9.

Figure 9:
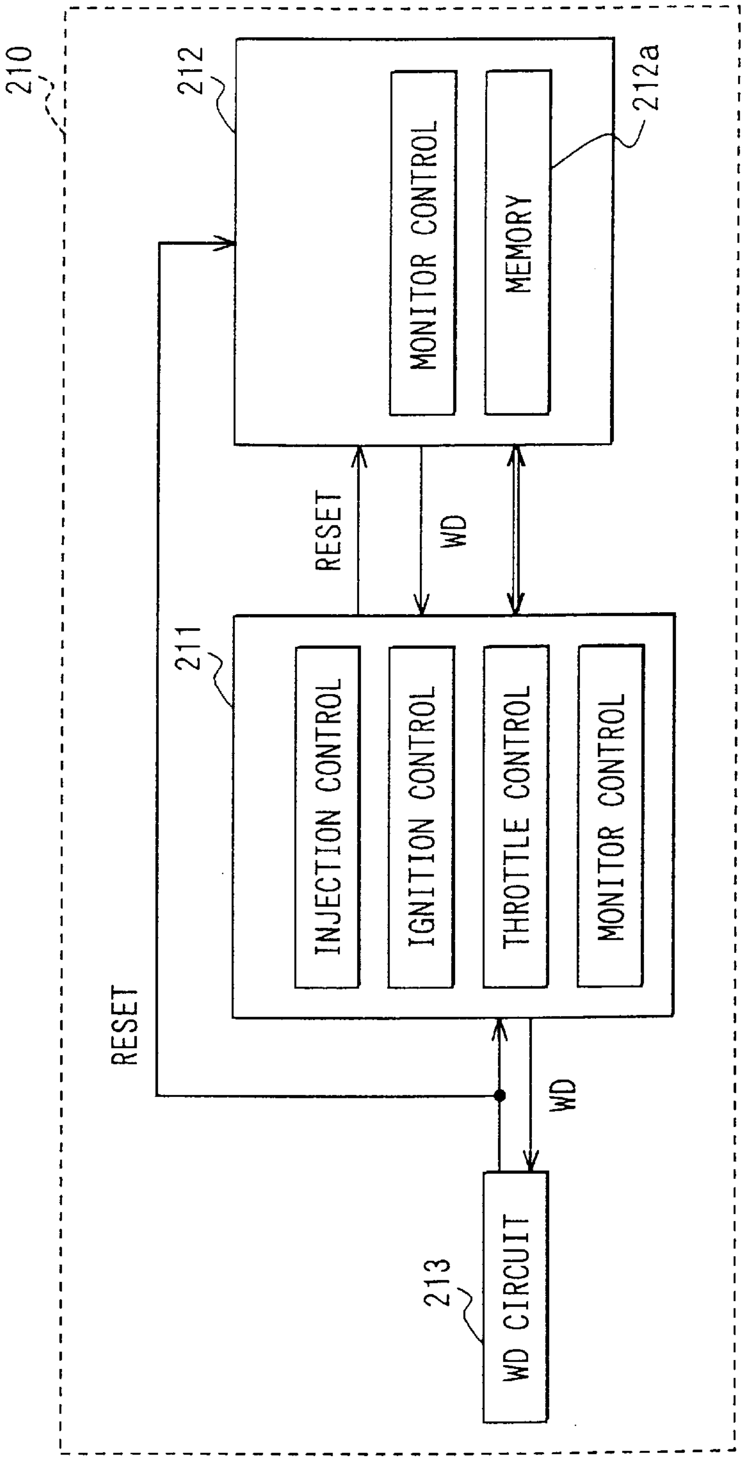
FIG. 9 is a block diagram of an engine ECU as a modification of the second embodiment.

In FIG. 9, the reset signal outputted to the control CPU 211 from the WD circuit 213 is also inputted to the monitor CPU 212. Namely, the control CPU 212 monitors a reset line to the control CPU 211 from the WD circuit 213. Thereafter, the monitor CPU 212 stores the reset record of the control CPU 211 to the memory 212*a* whenever the reset signal is inputted.

Figure 10A:
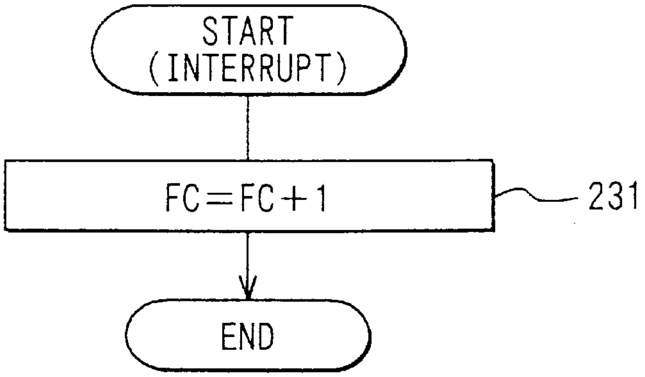
FIGS. 10A and 10B are flowcharts illustrating various processes executed by the monitor CPU in the modification of the second embodiment.
Figure 10B:
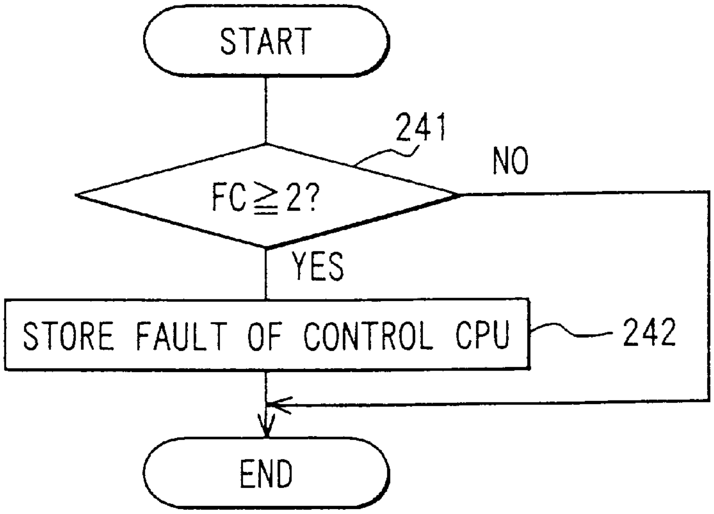

FIG. 10A illustrates a reset edge interruption process, while FIG. 10B illustrates an initial process, respectively. Namely, the monitor CPU 212 drives an interrupt process of FIG. 10A whenever an edge of the reset signal is inputted and increments the fault counter FC by one for every drive of such interrupt process (step 231). In the case of this embodiment, a count value of the fault counter corresponds to the “reset record”.

Moreover, the monitor CPU 212 drives the process of FIG. 10B in the initial condition when the CPU is started in order to determine whether the fault counter is equal to or larger than the predetermined value (2 in this embodiment) or not (step 241). When, the fault counter has the value 2 or larger, a content that a fault is generated in the control CPU 211 is stored in the memory 212*a* (step 242). In this case, fault information is notified to the control CPU 211 in order to execute the predetermined fail-safe process.

In this modified embodiment, reset condition of the control CPU 211 can surely be determined as in the case of the first embodiment. Therefore, the fail-safe process after a fault occurs in the CPU can be executed appropriately.

When the control CPU 211 resets subsequently the monitor CPU 212 when the control CPU 211 is reset in this embodiment, it is thought that there is no sufficient time for the monitor CPU 212 to store a reset record. Therefore, it is recommended that a delay circuit consisting of a capacitor or the like in the reset line to the monitor CPU 212 from the control CPU 211.

Accordingly, after the reset signal is outputted to the control CPU 211 from the WD circuit 213, the reset signal is outputted to the monitor CPU 212 from the control CPU 211 with a delay of constant time. Therefore, the monitor CPU 212 is surely capable of storing the reset record.

In the second embodiment and the modified embodiment, the equal WD pulse determining time may be set to both WD circuit 213 and the monitor CPU 212. In short, the monitor CPU 212 stores the reset record of the control CPU 211 at least until the WD circuit 213 outputs the reset signal. However, when the equal WD pulse determining time is set for both WD circuit 213 and monitor CPU 212, it is recommended to provide a delay circuit consisting of a capacitor or the like in the reset line between the monitor CPU 212 and the control CPU 211.

Here, it is possible to immediately determine a fault of control CPU only with single reset record. Of course, it is possible to determine a fault with three or more reset record. It is also possible to integrate the monitor CPU 212 and WD circuit 213 in the same circuit.

Moreover, it is possible to form structure that a CPU (main-CPU) for engine control and a CPU (sub-CPU) for electronic throttle control are individually provided. In this case, the sub-CPU monitors the WD pulse outputted to the WD circuit from the main-CPU and the sub-CPU stores, when periodicity of the WD pulse is disrupted, the reset record of the main-CPU to the memory at least until the WD circuit outputs the reset signal. Otherwise, the sub-CPU monitors the reset signal outputted to the main-CPU from the WD circuit and the sub-CPU stores the reset record to the memory when the reset signal is outputted.

(Third Embodiment)

Figure 11:
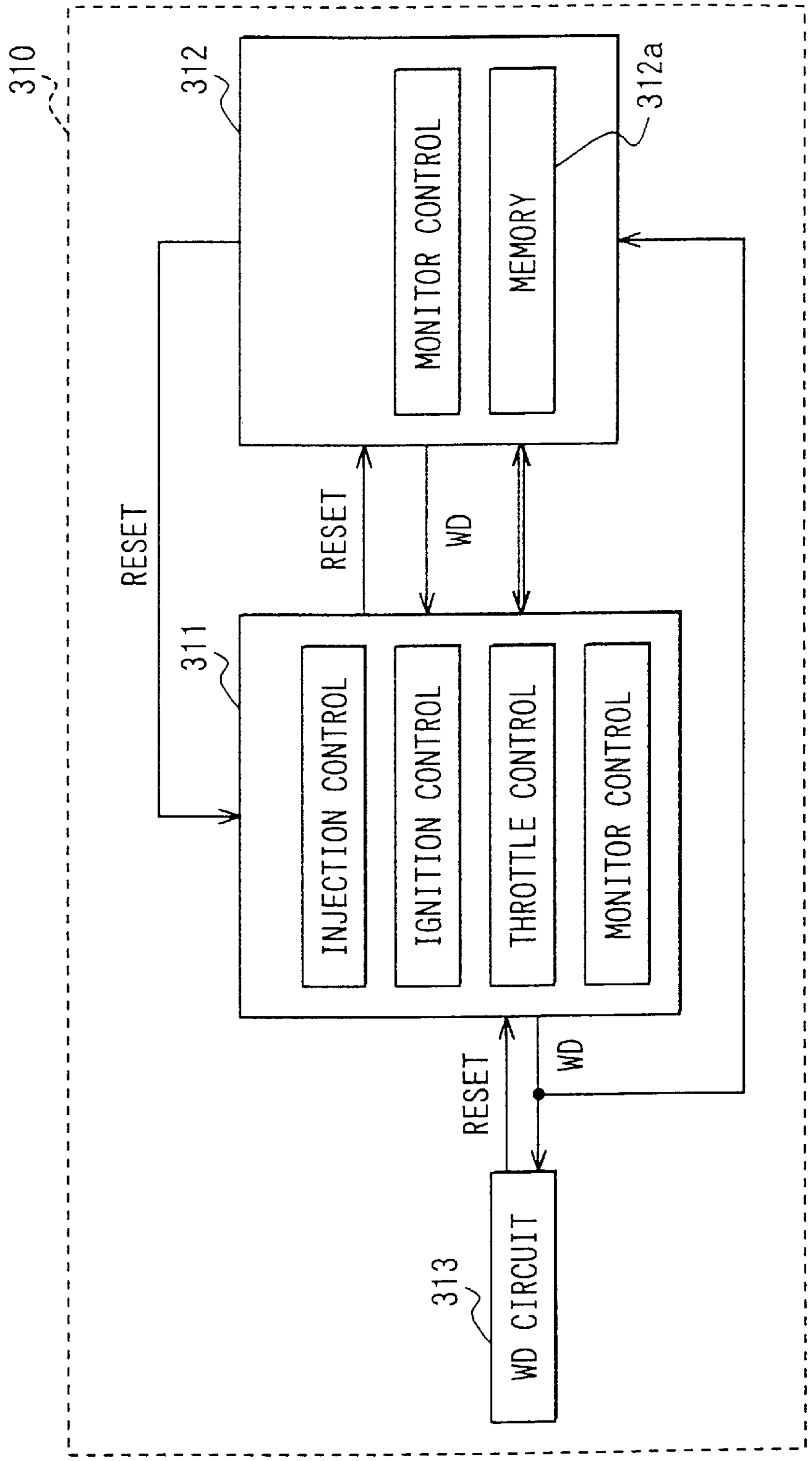
FIG. 11 is a block diagram of an engine ECU according to the third embodiment of the present invention.

In FIG. 11, an engine ECU 310 comprises a control CPU (main-CPU) 311 for injection control and ignition control of engine and electronic throttle control, a monitor CPU (sub-CPU) 312 for monitor control of the operations of control CPU 311 including the electronic throttle control, and a WD circuit 313 for monitoring operations of the control CPU 311. The control CPU 311 receives, as inputs from time to time, from various sensors engine operation information such as an engine speed, an intake manifold pressure and a throttle angle and controls injectors, an igniter and a throttle actuator or the like based on the relevant operation information.

Moreover, the control CPU 311 executes the monitor control for monitoring operations of the monitor CPU 312. Namely, the monitor CPU 312 outputs a WD pulse which is inverted in the predetermined cycle for the control CPU 311 and outputs a reset signal to the monitor CPU 312 when the WD pulse from the monitor CPU 312 is not inverted for the predetermined period or longer.

The control CPU 311 and monitor CPU 312 are mutually connected for communication and the control CPU 311 transmits the data for throttle control such as throttle angle, accelerator position and fail-safe execution flag to the monitor CPU 312. In this case, the control CPU 311 usually transmits the data in the constant period to the monitor CPU 312, while the monitor CPU 312 monitors the communication condition from the control CPU 311. Moreover, the monitor CPU 312 monitors the throttle control condition based on the contents of the received data. A result of monitor is returned to the control CPU 311.

The control CPU 311 executes the predetermined fail-safe process when a fault is generated depending on the result of monitor by the monitor CPU 312. More practically, as the fail-safe process, the cylinder reduction control for stopping fuel injection of a part of cylinders and ignition retard angle control of ignition time point are executed in order to realize a limp-home running of the vehicle.

Moreover, the control CPU 311 outputs the WD pulse which is inverted in the predetermined cycle to the WD circuit 313. This WD circuit 313 forms a watchdog monitor circuit and outputs a reset signal to the control CPU 311 when the WD pulse from the control CPU 311 is not inverted for the predetermined period or longer.

The WD pulse outputted to the WD circuit 313 from the control CPU 311 is also inputted to the monitor CPU 312. The monitor CPU 312 determines existence of the predetermined edge (for example, falling edge) of the WD pulse. When the predetermined edge cannot be detected for the predetermined period or longer, namely when the WD pulse is not inverted for the predetermined period or longer, it is determined that the WD pulse of the control CPU 311 has stopped.

The monitor CPU 312 is provided with a memory 312*a*. Therefore when a communication fault of control CPU 311 and an output fault (WD fault) of the WD pulse are detected, a record information is stored in the memory 312*a*. The memory 312*a* is for example an EEPROM or a standby RAM or the like which can also store and hold contents of power failure when it occurs.

In this third embodiment, the monitor CPU 312 is particularly capable of resetting the control CPU 311 directly. If communication with the control CPU 311 is not executed normally, the monitor CPU 312 outputs a reset signal to the control CPU 311. When the control CPU 311 is reset with the WD circuit 313 or monitor CPU 312, the monitor CPU 312 is also reset in conjunction with the control CPU 311. Moreover, in this third embodiment, a fault detection time when the monitor CPU 312 detects a communication fault of the control CPU 311 is defined as X (ms).

A fault detection time when the monitor CPU 312 detects a WD fault of the control CPU 311 is defined as Y (ms), and a fault detection time when the WD circuit 313 detects a WD fault of the control CPU 311 is defined as Z (ms). In this case, respective time are set to satisfy the respective fault detection times X, Y and X the relationship of $Y<Z<X$. More practically, these values are set as X=100 ms, Y=16 ms and Z=24 ms in this third embodiment.

The monitoring operations of the control CPU 311 will be explained in regard to the engine ECU 310. The flowcharts of FIG. 12 to FIG. 15 illustrate the processes of the monitor CPU 312 and these processes monitor the operations of the control CPU 311.

Figure 12:
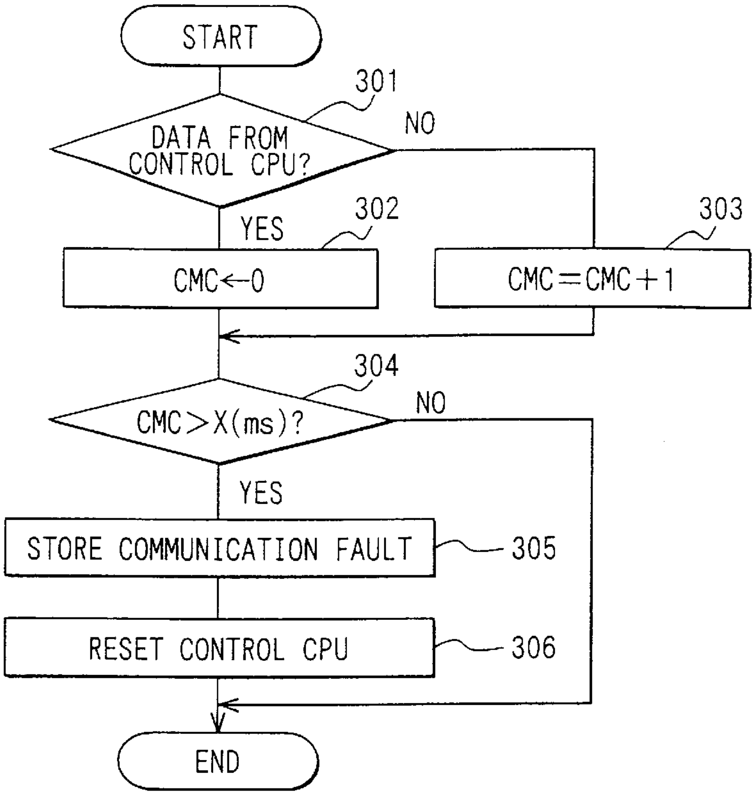
FIG. 12 is a flowchart of a communication fault detection process executed by a monitor CPU in the third embodiment.

FIG. 12 is a flowchart of the communication fault detection process to detect a communication fault of the control CPU 311. This process is executed, for example, in every 2 ms by the monitor CPU 312.

In FIG. 12, whether the communication data has been received from the control CPU 311 or not is first determined at step 301. When the result is YES (data is received), the communication monitor counter CMC is cleared to 0 at step 302. Moreover, when the result is NO (data is not received), the communication monitor counter CMC is incremented by one at step 303.

Thereafter, at step 304, whether the communication monitor counter CMC has a value larger than that corresponding to X (ms) or not is determined. When the result is NO, this process is completed. Meanwhile, the result is YES, a communication fault record is stored in the memory 312*a* (standby RAM) at step 305 and the control CPU 311 is reset in the subsequent step 306.

Figure 13:
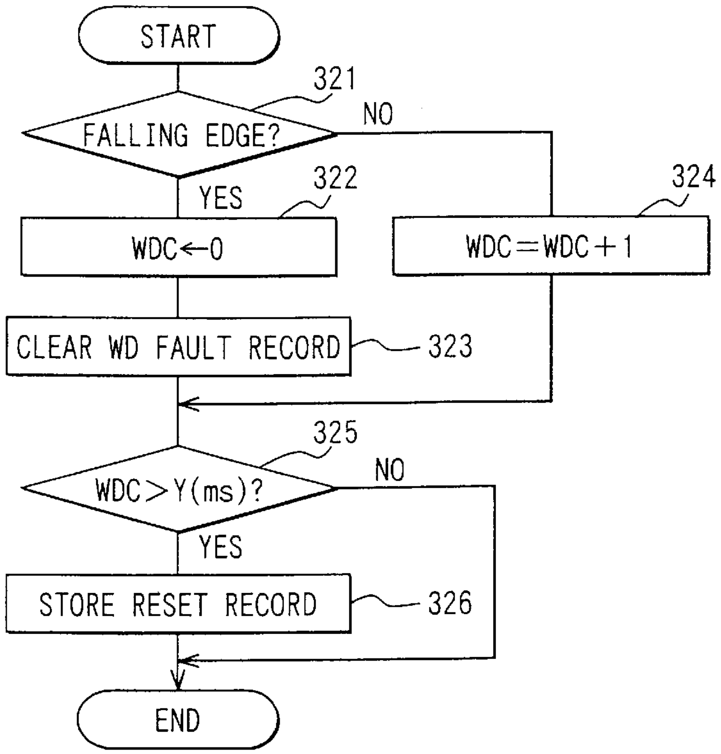
FIG. 13 is a flowchart of a WD fault detection process executed by the monitor CPU in the third embodiment.

Moreover, FIG. 13 is a flowchart of the WD pulse fault detection process. This process is executed, for example, in every 2 ms by the monitor CPU 312.

In FIG. 13, whether the falling edge of the WD pulse is detected or not is determined at step 321. When such a falling edge is detected, the WD monitor counter WDC is cleared to 0 at step 322 and the WD fault record is cleared at step 323. Moreover, if the falling edge of the WD pulse is not detected, the WD monitor counter WDC is incremented by one at step 324.

Thereafter, whether the WD monitor counter WDC has the value larger than that corresponding to Y (ms) or not is determined at step 325. When the result is NO, this process is completed. When the result is YES, the WD fault record is stored in the memory (standby RAM) 12*a* at step 326.

Figure 14:
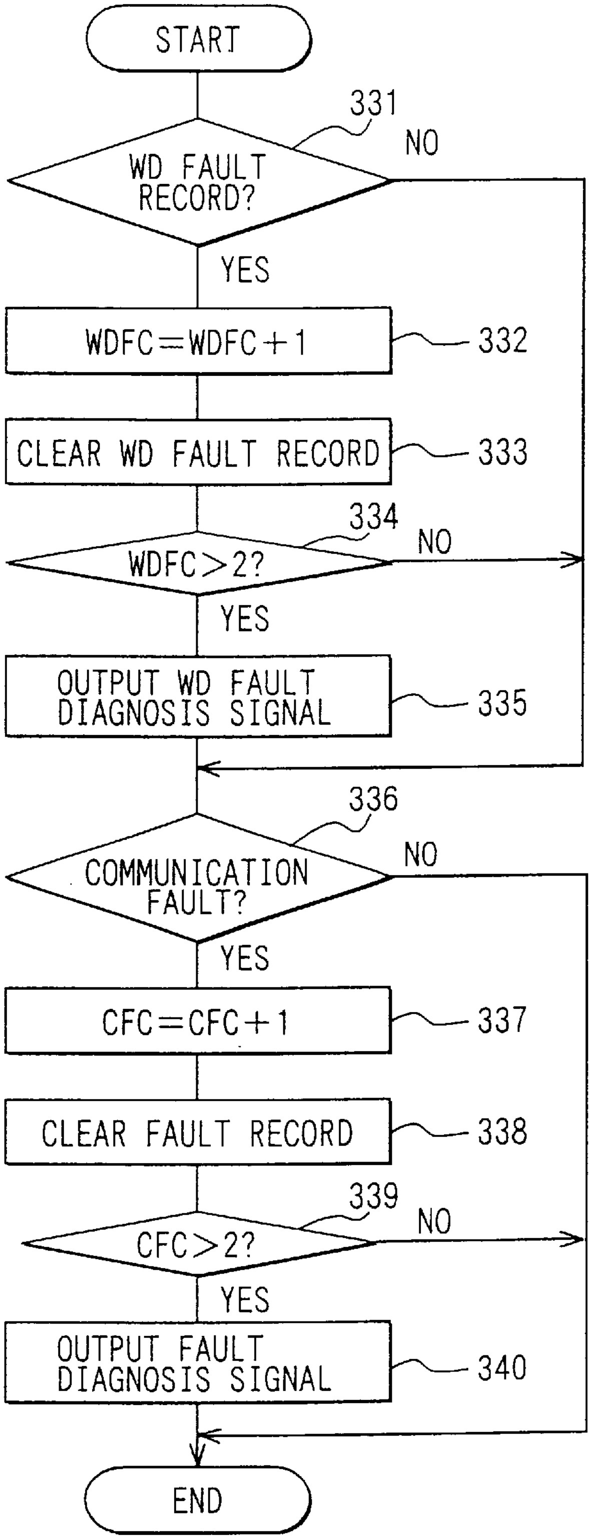
FIG. 14 is a flowchart of an initial process executed by the monitor CPU in the third embodiment.

FIG. 14 is a flowchart of the initial process by the monitor CPU 312. In FIG. 14, existence of the WD fault record in the memory 312 is determined at step 331. When the WD fault record exists, the processes of the steps 332 to 335 are executed. Namely, the WD fault counter WDFC is incremented by one at step 332 and the WD fault record is cleared in the subsequent step 333. Moreover, at step 334, whether the WD fault counter WDFC has the value larger than the predetermined value (2 in this embodiment) or not is determined. When the result is YES, the process proceeds to the step 335 to output a diagnosis signal indicating a WD fault (CPU fault).

Thereafter, when existence of communication fault record in the memory 12*a* is determined at step 336 and the communication fault record is determined to exist, the processes of the steps 337 to 340 are executed. Namely, at step 337, the communication fault counter CFC is incremented by one and the communication fault record is cleared in the subsequent step 338. Moreover, at step 339, whether the communication fault counter CFC has a value larger than the predetermined value (2 in this embodiment) or not is determined. When the result is YES, the process proceeds to the step 340 to output a diagnostic signal indicating a communication fault.

The counter value of the communication fault and WD fault is deleted when the ignition switch is turned off. Namely, the monitor CPU 312 executes the process of FIG. 15 when the IG switch is turned off. In this case, the monitor CPU 312 clears the communication fault counter at step 341 and also clears the WD fault counter at step 342. In addition, at step 343, the monitor CPU 312 clears the communication fault record at step 343 and also clears the WD fault record at step 344.

Figure 15:
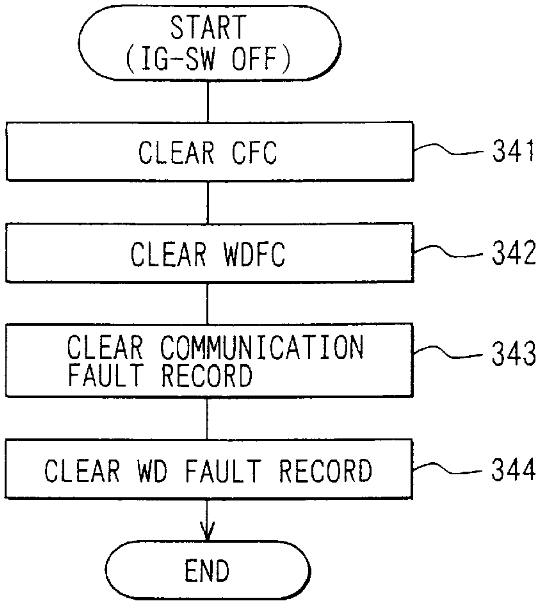
FIG. 15 is a flowchart of a process executed by the monitor CPU in the third embodiment when the ignition switch is OFF.

According to the processes of FIG. 14 and FIG. 15, a diagnostic output is implemented when the WD fault or communication fault is generated twice or more during single trip (during the period between ON and OFF of the IG switch). When the diagnostic signal is outputted, the control CPU 311 executes the predetermined fail-safe process. Namely, the cylinder reduction control and ignition retard control or the like is executed to conduct the limp-home running.

Figure 16:
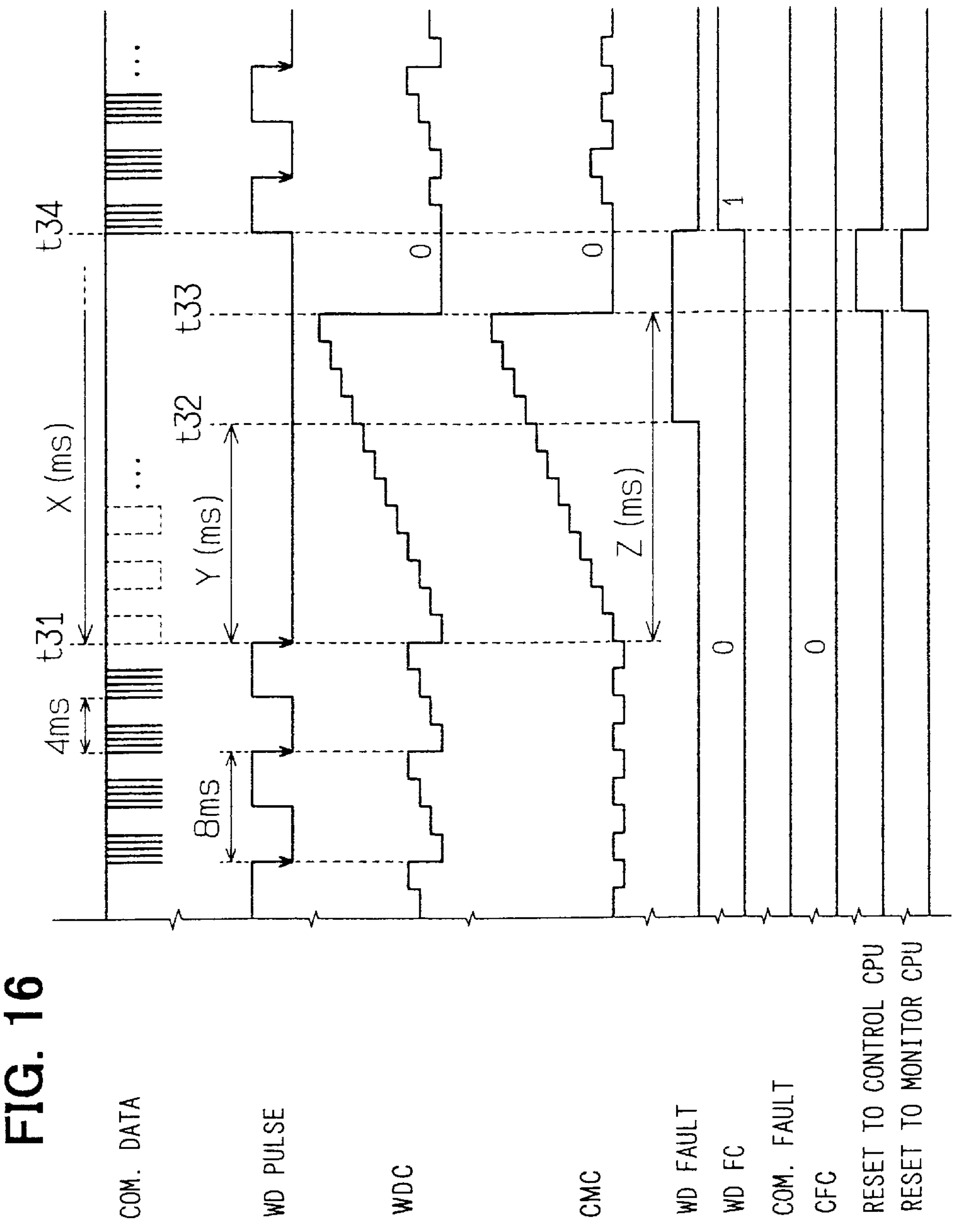
FIG. 16 is a time chart illustrating operations when a control CPU is operated uncontrollably in the third embodiment.

Next, fault monitor will be explained with reference to the time chart of FIG. 16. FIG. 16 assumes that the control CPU 311 operates uncontrollably after the time point t31.

In FIG. 16, communication data is transmitted periodically (in every 4 ms) before the time point t31 to the monitor CPU 312 from the control CPU 311. The WD pulse is inverted in the predetermined cycle (8 ms period). In this case, values of the WD monitor counter WDC and communication monitor counter CMC change in the values near to 0. Of course, a fault record is not stored.

At time point t31, the communication and output of WD pulse are stopped due to uncontrollable operation (fault) of the control CPU 311. Therefore, the WD monitor counter WDC and communication monitor counter CMC are gradually counted up and the WD fault record is stored in the memory 312*a* at time point after the fault detection time Y has passed.

Thereafter, moreover, at time point t33 after the fault detection time Z has passed, the reset signal is outputted to the control CPU 311 from the WD circuit 313. Thereby, the control CPU 311 is reset and subsequently the monitor CPU 312 is also reset. Subsequently, when the CPUs 311 and 312 are re-started at time point t34, the WD fault record in the memory 312*a* is cleared and the WD fault counter WDFC is counted up by one. When the control CPU 311 is recovered to the normal condition as illustrated in the figure after the time point t34, the values of the WD monitor counter WDC and the communication monitor counter CFC changes again at the values near to 0.

In FIG. 16, there is a relationship of Y<Z, the monitor CPU 312 can surely store and hold the WD fault record before the reset output by the WD circuit 313. Moreover, since there exists the relationship of Y<X, a disadvantage that the control CPU 311 is reset due to a communication fault before the WD fault record is stored is not generated. Therefore, the WD fault record can surely be stored and held.

Although not illustrated in the figure, when the communication stops and WD pulse becomes normal in the control CPU 311, only the communication monitor counter CMC is gradually counted up. When a value of the communication monitor counter CMC becomes equal to the value corresponding to X, a communication fault record is stored in the memory 312*a* and the control CPU 311 is reset by the monitor CPU 312.

On the contrary, when the WD pulse stops and communication becomes normal in the control CPU 311, only the WD monitor counter WDC is gradually counted up. When a value of the WD monitor counter WDC becomes a value corresponding to Y as in the case of FIG. 16, the WD fault record is stored in the memory 312*a*. Moreover, the control CPU 311 is reset by the WD circuit 313 when the fault detection time Z has passed from generation of the WD fault.

According to this embodiment explained above in detail, since the fault detection times X, Y, Z are specified to satisfy the relationship of Y<Z<X, the WD pulse fault and communication fault are surely stored individually even when the control CPU 311 is operated uncontrollably and thereby content of each fault can be identified appropriately.

Since content of fault can be identified accurately, the subsequent fail-safe process can also be executed appropriately. Namely, appropriate process can be selected depending on the communication fault or WD pulse fault (CPU fault).

Figure 17:
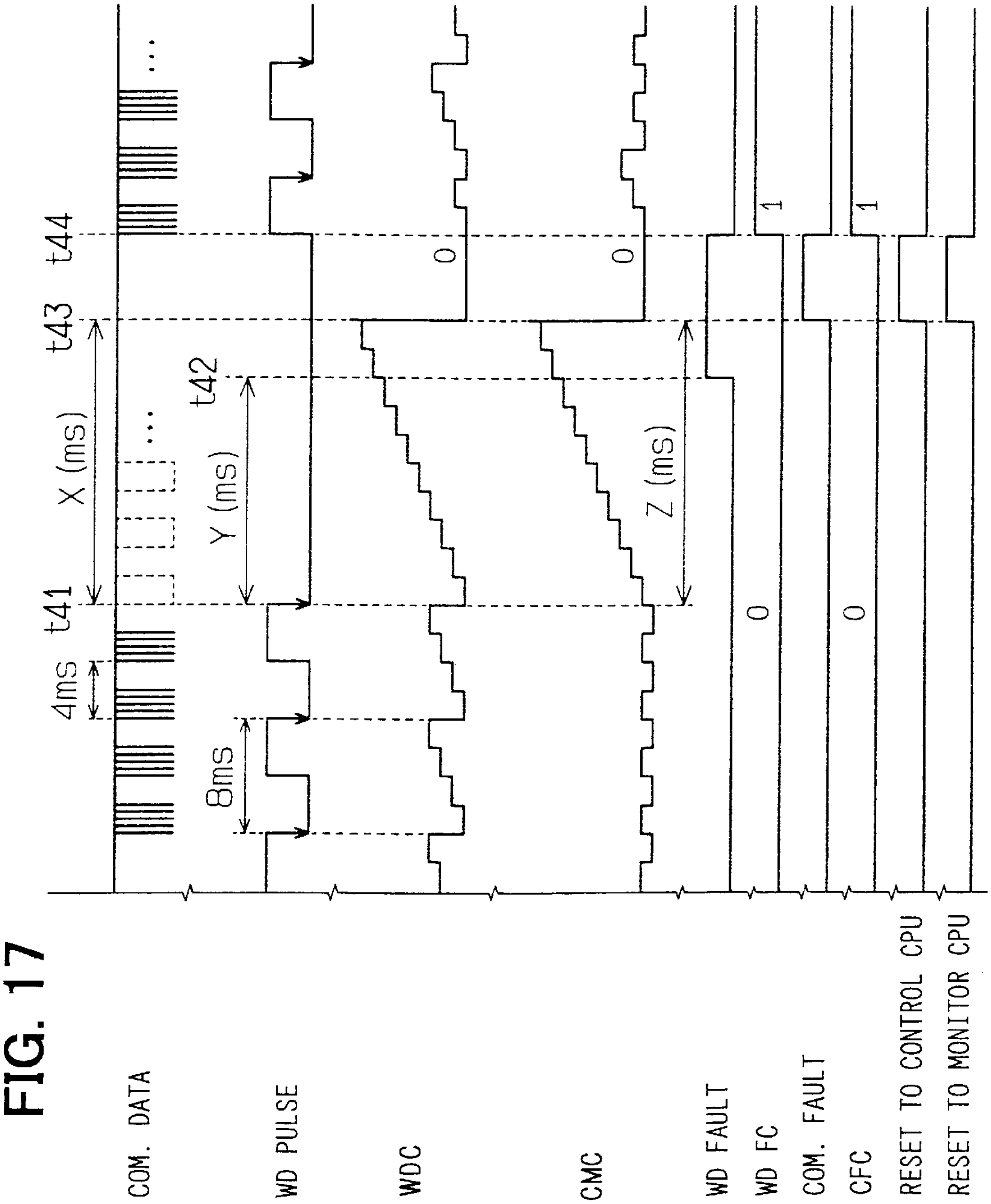
FIG. 17 is a time chart illustrating operations when the control CPU is operated uncontrollably in the third embodiment.

In the above structure, each fault detection time X, Y, Z is specified to satisfy the relationship of Y<Z<X. However this relationship may also be specified as Y<X<Z. Namely, the relationship between the fault detection times X and Z is inverted (X<Z). The time chart in this relationship is illustrated in FIG. 17. FIG. 17 illustrates operations in the condition that the control CPU 311 is operated uncontrollably as in the case of FIG. 16.

In FIG. 17, communication and WD pulse output of the control CPU 311 is stopped at time point t41 as in the case of FIG. 16. Therefore, the WD monitor counter WDC and communication monitor counter CMC are gradually counted up and the WD fault record is stored in the memory 312*a* at time point t42 after the fault detection time Y has passed.

Thereafter, the communication fault record is stored in the memory 312*a* at time point t43 after the fault detection time X has passed. In this time point t43, the control CPU 311 is reset by the monitor CPU 312. Subsequently, when each CPU 311, 312 is re-started at time point t44, the WD fault record and communication fault record in the memory 312*a* are cleared and the WD fault counter WDFC and communication fault counter FCF are respectively counted up by one.

As explained above, when the relationship Y<X<Z is specified, both WD fault record and communication fault record are surely stored when both communication and WD pulse output are stopped due to the uncontrollable operation of the control CPU 311.

The third embodiment may be modified as follows. That is, the fault detection times X, Y are specified as X<Y. In this case, since X<Y, a communication fault is likely to be detected in advance when the control CPU 311 is operated uncontrollably and the control CPU 311 is reset before the WD fault record is stored. In this case, however, whether the control CPU 311 may be reset or not when the communication fault is detected is determined. Namely, the reset output is permitted or inhibited depending on the result of determination. Accordingly, content of a fault can be identified accurately.

Figure 18:
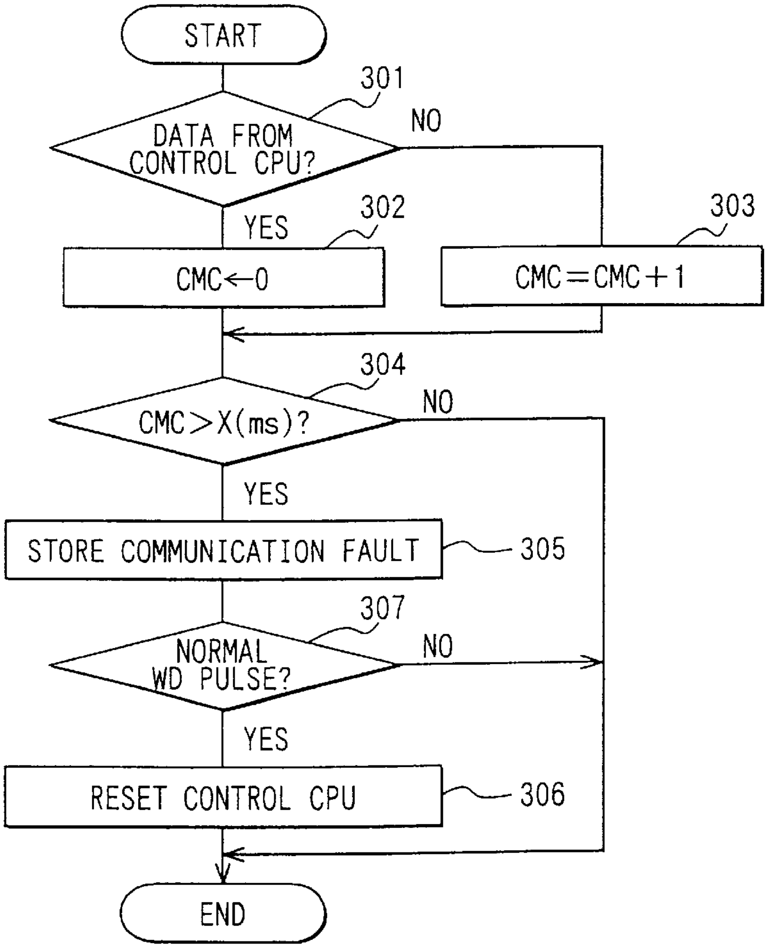
FIG. 18 is a flowchart of a communication fault detection process executed by the monitor CPU in a modification of the third embodiment.

FIG. 18 is a flowchart of the communication fault detection process of this modification. In this process, the process of step 307 is added to the processes of FIG. 12. In FIG. 18, when a value of the communication monitor counter CMC becomes larger than the value corresponding to X (ms), a communication fault record is stored in the memory 312*a* (steps 304, 305). At step 307, whether the WD pulse is normal or not is estimated. In this case, normal/fault condition of the WD pulse is estimated by confirming the edge of the WD pulse. When the WD pulse is estimated to be a fault, the process is completed here. Moreover, when the WD pulse is estimated to be normal, the process proceeds to the step 306 to reset the control CPU 311.

Figure 19:
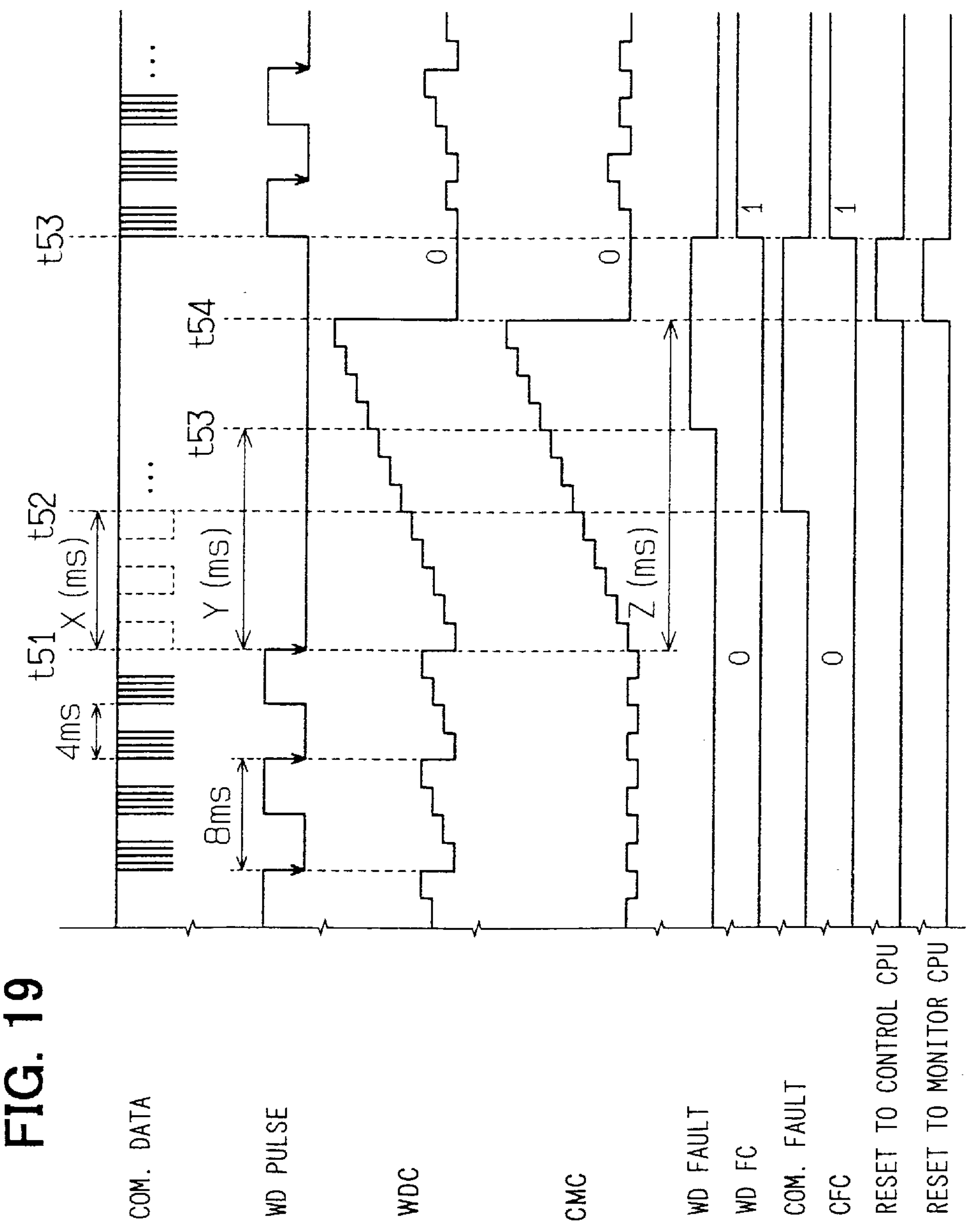
FIG. 19 is a time chart illustrating operations when the control CPU is operated uncontrollably in the modification of the third embodiment.

FIG. 19 illustrates a time chart corresponding to the processes of FIG. 18. In this figure, operations when the control CPU 311 is operated uncontrollably are illustrated as in the case of FIG. 16.

In FIG. 19, the communication and WD pulse output of the control CPU 311 are stopped at time point t51 as in the case of FIG. 16 and the WD monitor counter WDC and communication monitor counter CMC are gradually counted up. At time point t52 after the fault detection time X has passed, a communication fault record is stored in the memory 312*a*. In this case, normal/fault condition of the WD pulse can be estimated. When a WD fault can be estimated, the control CPU 311 is not reset by the monitor CPU 312 (illustrated condition).

The WD fault record is stored in the memory 312*a* at time point t53 after the fault detection time Y has passed and the control CPU 311 is reset by the WD circuit at time point t54 after the fault detection time Z has passed. Thereafter, when the CPUs 311 and 312 are-re-started at time point t55, the WD fault record and communication fault record in the memory 312*a* are cleared and the WD fault counter WDFC and communication fault counter CFC are respectively counted up by one respectively.

However, when the WD pulse is assumed to be normal at time point t52, the control CPU 311 is reset at this time point. When the WD pulse fault is erroneously assumed at time point t52, the control CPU 311 is not reset at this time point. However, when the communication fault is detected next, the control CPU 311 is reset.

In short, when the WD pulse is assumed to be defective when the communication fault is detected, it is probable that fault of WD pulse may be stored when the fault detection time Y has passed subsequently. Therefore, the reset of the control CPU 311 is restricted. The WD pulse fault and communication fault can surely be stored respectively.

In the modification of this embodiment, it is also possible that a reset output to the control CPU 311 is limited depending on the fault record (fault record of communication or WD pulse) in the past when the communication fault is detected.

On the occasion of specifying the fault detection times X, Y, Z, relationship of these times may be specified to include the equal values such as X is equal to or larger than Y, X is equal to or smaller than Z, and Y is equal to or smaller than Z. In short, it is only necessary that the information such as fault record can surely be stored even if the fault detection time is equal.

It is also possible here that the monitor CPU 312 and WD circuit 313 are integrated in one circuit. In the above embodiments, as the control CPU 311, it is also possible that the CPU (main-CPU) for engine control and the CPU (sub-CPU) for electronic throttle control, for example, are provided individually.

What is claimed is:

1. An electronic control unit for a vehicle comprising:

a CPU having a predetermined fail-safe function required after occurrence of a fault in addition to a vehicle operation control;

a monitor circuit for receiving as an input from the CPU a watchdog pulse generated in a predetermined cycle and outputting a reset signal to the CPU when periodicity of the watchdog pulse is disrupted; and a memory for storing reset information indicating a record thereof when the reset signal is outputted from the monitor circuit, wherein the CPU executes the predetermined fail-safe process based on the reset information stored in the memory after the CPU is once reset and thereafter re-started.

2. The electronic control unit as in claim 1, wherein the memory is integrated with the monitor circuit.

3. The electronic control unit as in claim 1, wherein the memory is formed as a reset counter for counting up the number of times of reset as the reset information, and wherein the CPU executes the fail-safe process when a reset counter value reaches a predetermined threshold value when the CPU is re-started.

4. The electronic control unit as in claim 1, wherein the CPU clears the reset information of the memory.

5. The electronic control unit as in claim 4, wherein the CPU clears the reset information of the memory after an ignition switch is turned off.

6. An electronic control unit for a vehicle comprising:

a main-CPU for executing a vehicle control;

a monitor circuit for receiving from the main-CPU as an input a watchdog pulse generated in a predetermined cycle, and outputting a reset signal to the main-CPU when periodicity of the watchdog signal is disrupted; and a sub-CPU connected to the main-CPU for making communication, wherein the main-CPU subsequently resets the sub-CPU when the main-CPU is rest, and wherein the sub-CPU monitors the watchdog pulse outputted to the monitor circuit from the main-CPU and stores a reset record of the main-CPU to a memory until at least a reset signal is outputted from the monitor circuit when the periodicity of the watchdog pulse is disrupted.

7. The electronic control unit as in claim 6, wherein the sub-CPU checks existence of a predetermined edge of the watchdog pulse, assumes, when there is no predetermined edge of the watchdog pulse, that the main-CPU will be reset, and stores a reset record in the memory, and thereafter deletes the reset record stored when the predetermined edge of the watchdog pulse is detected before the monitor circuit outputs the reset signal.

8. The electronic control unit as in claim 6, wherein the sub-CPU determines that the main-CPU is defective when the reset record is stored for a predetermined number of times.

9. The electronic control unit as in claim 6, wherein the main-CPU executes, after the main-CPU is once reset and re-started, the predetermined fail-safe process based on the reset record stored in the sub-CPU.

10. The electronic control unit as in claim 6, wherein the main-CPU outputs a reset signal to the sub-CPU with a constant delay time after the monitor circuit outputs the reset signal to the main-CPU.

11. The electronic control unit as in claim 6, wherein the main-CPU has an engine control function and an electronic throttle control function for a vehicle, while the sub-CPU monitors the condition of the electronic throttle control of the main-CPU.

12. An electronic control unit for a vehicle comprising:

a main-CPU for executing a vehicle control;

a monitor circuit for receiving as an input from the main-CPU a watchdog pulse which is generated in the predetermined cycle, and outputting a reset signal to the main-CPU when the periodicity of the watchdog pulse is disrupted; and a sub-CPU connected to the main-CPU for making communication, wherein the main-CPU subsequently resets the sub-CPU when the main-CPU is reset, and wherein the sub-CPU monitors the reset signal outputted to the main-CPU from the monitor circuit and stores a reset record in a memory at the time of outputting the reset signal.

13. The electronic control unit as in claim 12, wherein the sub-CPU determines that the main-CPU is defective when the reset record is stored for a predetermined number of times.

14. The electronic control unit as in claim 12, wherein the main-CPU executes, after the main-CPU is once reset and re-started, the predetermined fail-safe process based on the reset record stored in the sub-CPU.

15. The electronic control unit as in claim 12, wherein the main-CPU outputs a reset signal to the sub-CPU with a constant delay time after the monitor circuit outputs the reset signal to the main-CPU.

16. The electronic control unit as in claim 12, wherein the main-CPU has an engine control function and an electronic throttle control function for a vehicle, while the sub-CPU monitors the condition of the electronic throttle control of the main-CPU.

17. An electronic control unit for a vehicle comprising:

a control CPU for executing a vehicle control; and a monitor CPU connected to the control CPU for making communication, wherein the monitor CPU includes a first fault detection means which monitors communicating condition with the control CPU, stores a defective condition when a fault occurs in the communicating condition and resets the control CPU, and a second fault detection means which monitors a watchdog pulse outputted from the control CPU, detects a fault from periodicity of the watchdog pulse and stores the condition when a fault occurs in the watchdog pulse, and wherein the fault detection times X, Y are specified to satisfy a relationship of $X \geqq Y$ when the fault detection time of the first fault detection means is defined as X and the fault detection time of the second fault detection means as Y.

18. The electronic control unit as in claim 17, further comprising:

a watchdog monitor circuit for receiving, from the control CPU, a watchdog pulse as an input and outputting a reset signal to the control CPU when the watchdog pulse is interrupted for a predetermined monitor time Z, wherein the fault detection time X of the first fault detection means and the monitor time Z of the WD monitor circuit are specified to satisfy the relationship of $X \leqq Z$.

19. The electronic control unit as in claim 17, further comprising:

a watchdog monitor circuit for receiving, from the control CPU, a watchdog pulse as an input and outputting a reset signal to the control CPU when the watchdog pulse is interrupted for a predetermined monitor time Z, wherein the fault detection time Y of the second fault detection means and the monitor time Z of the WD monitor circuit are specified to satisfy the relationship of $Y \leqq Z$.

20. An electronic control unit comprising:

a control CPU for executing a vehicle control; and a monitor CPU connected the control CPU for making communication, wherein the monitor CPU includes a first fault detection means which monitors communicating condition with the control CPU, stores a defective condition when a fault occurs in the communicating condition and resets the control CPU, and a second fault detection means which monitors a watchdog pulse outputted from the control CPU, detects a fault from periodicity of the watchdog pulse and stores the condition when a fault occurs in the watchdog pulse, wherein when a fault detection time of the first fault detection means is defined as X and a fault detection time of the second fault detection means as Y, the fault detection times X and Y are specified to satisfy the relationship of $X<Y$, and wherein the monitor CPU determines, when a communication fault is detected by the first fault detection means, whether a reset signal may be outputted to the control CPU and restricts output of the reset signal depending on the result of determination.

21. The electronic control unit as in claim 20, wherein the monitor CPU assumes, when a communication fault is detected by the first fault detection means, whether a watchdog pulse is normal or defective and does not reset the control CPU when the watchdog pulse is assumed to be defective.

22. The electronic control unit as in claim 20, further comprising:

a watchdog monitor circuit for receiving, from the control CPU, a watchdog pulse as an input and outputting a reset signal to the control CPU when the watchdog pulse is interrupted for a predetermined monitor time Z, wherein the fault detection time Y of the second fault detection means and the monitor time Z of the WD monitor circuit are specified to satisfy the relationship of $Y \leqq Z$.

* * * * *